US012754845B2

(12) United States Patent
Mattina et al.

(10) Patent No.: US 12,754,845 B2
(45) Date of Patent: Oct. 6, 2026

(54) DATA IDENTITY BASED CACHING IN A NETWORK OF COMPUTATIONAL NODES

(71) Applicant: Tenstorrent USA, Inc., Austin, TX (US)

(72) Inventors: Matthew Mattina, Boylston, MA (US); Syed Gilani, Markham (CA); Stanislav Sokorac, Austin, TX (US)

(73) Assignee: Tenstorrent USA, Inc.

(*) Notice: Subject to any disclaimer, the term of this patent is extended or adjusted under 35 U.S.C. 154(b) by 2 days.

(21) Appl. No.: 19/042,943

(22) Filed: Jan. 31, 2025

(65) Prior Publication Data

US 2025/0258770 A1 Aug. 14, 2025

Related U.S. Application Data

(60) Provisional application No. 63/548,837, filed on Feb. 1, 2024.

(51) Int. Cl.
*G06F 12/0815* (2016.01)

(52) U.S. Cl.
CPC ................................ *G06F 12/0815* (2013.01)

(58) Field of Classification Search
CPC ......................... G06F 12/0815; G06F 12/0813
See application file for complete search history.

(56) References Cited

U.S. PATENT DOCUMENTS

| | | | | |
|---|---|---|---|---|
| 2019/0097838 | A1 | 3/2019 | Sahoo et al. | |
| 2021/0034538 | A1* | 2/2021 | Meiri | G06F 3/0614 |
| 2021/0056031 | A1* | 2/2021 | Walker | G06F 12/0811 |
| 2022/0027052 | A1* | 1/2022 | Falco | H04L 67/1095 |
| 2022/0318144 | A1* | 10/2022 | Bajic | G06F 12/0646 |
| 2022/0366526 | A1 | 11/2022 | Das et al. | |
| 2023/0094030 | A1 | 3/2023 | Jha et al. | |
| 2023/0297440 | A1* | 9/2023 | Cowperthwaite | G06F 9/5077 718/104 |
| 2026/0079831 | A1* | 3/2026 | Suzuki | G06F 12/0246 |

OTHER PUBLICATIONS

International Search Report and Written Opinion from International Application No. PCT/US25/14228 dated May 1, 2025, 12 pages.

* cited by examiner

*Primary Examiner* — Edward J Dudek, Jr.
(74) *Attorney, Agent, or Firm* — Daylight Law, P.C.

(57) ABSTRACT

Systems and methods related to data identity based caching in a network of computational nodes are disclosed herein. A system may include a set of computational nodes, an interconnect fabric that networks the set of computational nodes, and a set of caches. The caches may be uniquely associated with the computational nodes and may store data in the caches based on an identity of the data. For example, the caches may store data based on the data being read-only data, based on the data being in an address range, or based on the data being fixed for a remainder of a complex computation. Basing the storage of data in the caches on the identity of the data may reduce cache coherency issues.

17 Claims, 9 Drawing Sheets

DATA IDENTITY BASED CACHING IN A NETWORK OF COMPUTATIONAL NODES

CROSS REFERENCE TO RELATED APPLICATIONS

This application claims the benefit of U.S. Provisional Patent Application No. 63/548,837, filed on Feb. 1, 2024, which is incorporated by reference herein in its entirety for all purposes.

BACKGROUND

Caches are components which store data. They can be implemented in hardware or software. A computing component such as a processor, processor core, processing pipeline, operating system, web browser, or other client, can obtain stored data from a cache by sending the cache an access request to the cache and store data in the cache by sending a storage request to the cache. The cache can service these requests by returning the data that is the subject of the access request or by storing the data that is the subject of the storage request. The cache can store the data in a cache memory, which stores a small amount of data but can provide it quickly, or in a back store memory, which can store more data but provides the data more slowly. Caches can also be shared amongst various computing components.

FIG. 1 is a block diagram 100 of the operation of a cache to illustrate some of the terms used in this disclosure. The block diagram shows the cache operating to process an access request and retrieve data, but similar principles apply to processing a storage request. Block diagram 100 includes client 110 which sends access requests 111 to cache 120 and holds for access request responses 112. If the cache is successful, the access request responses 112 will include the requested data. Upon receiving access request 111, cache 120 will retrieve the requested data either from cache memory 122, or, if the data is not present in cache memory 122, from back store 130. An example of cache memory 122 and back store 130 are a high-speed static random-access memory (SRAM) and a dynamic random-access memory (DRAM) respectively. Caches can also include back stores with different kinds of memory which are broken into different levels based on how fast the memory is, with the higher levels being occupied by higher speed memories. As used in this disclosure, data is "cached" by cache 120 if the data is stored to be accessible for return in an access request response 112 regardless of whether the data is stored in cache memory 122 or in back store 130. In addition to cache 120 and back store 130, client 110 has access to scratch pad memory 123 which can be used to store data that is most frequently used by client 110 or that otherwise needs to be most readily available for use by client 110. The scratch pad memory 123 can comprise flip flops, registers, or very high-speed random-access memory.

Caches can process an access request faster if they can anticipate what data will be requested and store it in a faster memory. When the cache successfully anticipated which data would be requested in an access request and had the data available and stored in cache memory 122, it can be referred to as a cache "hit." If the data is not available in cache memory 122, and cache 120 had to access the data from back store 130, it can be referred to as a cache "miss." Cache controller 121 can be configured to maximize the ratio of cache hits to access requests and the overall speed at which access requests from client 110 are serviced with access request responses 112.

In the context of networked computational nodes such as multiple networked processors or multiple cores in a multicore processor, each computational node may have its own local cache while sharing a common back store and a common body of data. The common back store can be another layer of cache or a main memory. Regardless, this introduces the problem of cache coherency in which multiple network computational nodes may have different values for the same element of data. For example, one processor may update its local cache with a new value for a variable while other processors still hold outdated copies in their local caches. This leads to undesirable inconsistencies in the system which is why cache coherency must be enforced through various techniques.

Machine intelligence systems represent one of the most computationally complex and energy intensive computation applications of the modern age and create issues for the design of all aspects of a computing system including the cache. A typical machine intelligence system such as an artificial neural network (ANN) takes in an input tensor, conducts calculations using the input tensor and a set of network tensors, and produces an output tensor. The output tensor represents an inference generated by the network in response to the input. For example, if the ANN were an image classifier, the input could be an encoding of an image of a cat, and the output vector could be an inference indicating that the subject of the image was a cat. The reason these systems are so resource hungry is that the data structures they are operating on are generally very large, and the number of discrete primitive computations that must be executed on each of the data structures is likewise immense.

Machine intelligence systems represent a challenging environment both in terms of the number of computations that are required and the large data structures that must be moved between memory and the computation area of the system for those computations to be executed. The massive flows of data between the processing units, the cache, and the back store form a critical design challenge for machine intelligence systems. The flows of data can be broken down into the movement of network data and the movement of execution data. Network data is the data that defines the machine intelligence system and execution data is data that is generated when the machine intelligence system is being used to generate an inference. The network data for a standard ANN can often comprise billions of discrete data entries. The network data can comprise weight vectors, filter vectors, and various other kinds of data based on the type of ANN. The network data is static and immutable throughout the course of an execution of the ANN. The network data is usually organized into layers with the output of each layer serving as the input to the next layer. In a traditional ANN, the layers are fully connected, which requires every element of the input vector to be involved in a calculation with every element of the weight vector. The resulting number of calculations involved is very large. Furthermore, the input data to the ANN, the network data for the ANN, and the execution data that is generated through the execution of one layer of the ANN to serve as inputs for the next layer of the ANN all need to be held in memory until they are used for computations in the next layer.

SUMMARY

Methods and systems related to caches for networks of computational nodes are disclosed herein. The computational nodes can be processors or processor cores that are cooperating in the execution of a complex computation. The complex computation can be a composite computation where different component computations of that composite computation are executed by different computational nodes in the network of computational nodes. Specific embodiments of the inventions disclosed herein are applicable to networks of computational nodes that are used for artificial intelligence workloads. For example, a network of computational nodes in accordance with this disclosure could be a group of cores in a multicore processor that are linked together to form an artificial intelligence accelerator. The caches can be utilized by the computational nodes in the network of computational nodes and commonly controlled by a cache controller.

In a specific embodiment, a system will include a set of computational nodes that are cooperatively executing a composite computation where each computational node has access to a first memory and a second memory associated with each individual computational node. For example, the first memory can be a scratch pad memory for the computational node and the second memory can be a cache for the computational node. The scratch pad memory can be a local memory. The system can be designed such that the first memory is used for data generally and the cache is only used for read-only data. For example, the first memory could be a scratch pad memory that is used for execution data when executing an ANN while the second memory is a cache memory that is only used for the network data of that ANN. In specific embodiments, the second memory can also be used for execution data from a layer of the ANN that has been finally calculated (e.g., the final result of a composite computation in which each component computation has been completed). Such values could be the output values of one layer of the ANN and the input values of the next layer. Embodiments that are in accordance with these approaches offer significant benefits in that, among other benefits, cache coherence problems for the cache are completely obviated. For example, using this approach there is no chance that a computational node will read the wrong value from the cache because a local instance of that value will always be the true value since the value does not change through the course of the composite computation. This approach is described with reference to FIG. 2 in the detailed description below.

In specific embodiments, a system will include a set of computational nodes that are cooperatively executing a composite computation where each computational node has access to a memory for reading and writing data used in the composite computation. The memory can include a cache. Each computational node can include a cache that is uniquely associated with that computational node. The cache of each computational node can be assigned a unique address range from a shared address space. The shared address space can be a global address space that is shared by all the computational nodes that are cooperatively executing the composite computation. For example, a first cache can be associated with an address range of 0 to 999 while a second cache is associated with an address range of 1000 to 1999 where the shared address space has 2000 addresses. The cache policy of all the caches in the system can be set such that each individual computational node only has write access to their associated address range within the shared address space. Accordingly, a read to a cache address that is not associated with a computational node's own cache will be translated to a request sent through a network connecting the computational nodes to the cache that is associated with that address while a read to a cache address that is associated with a computational node's own cache can be handled by the local cache. In this manner, cache coherency is obviated because there is only one unique place that data can be stored across the system. The address space and the location of the data within the address space can be administrated by one or more tables in the computational nodes. The table or tables may only distinguish between local and remote address ranges while a separate table associated with the network administrates the transfer of remote address requests to the appropriate cache in the system. This approach is described with reference to FIG. 3 in the detailed description below.

In specific embodiments of the invention, a system is provided. The system comprises: a set of computational nodes, an interconnect fabric that networks the set of computational nodes, and a set of caches wherein the caches in the set of caches are uniquely associated with the computational nodes in the set of computational nodes and store data in the caches in the set of caches based on an identity of the data.

In specific embodiments of the invention, a method, in which each step is conducted by a set of computational nodes that are networked by an interconnect fabric, is provided. The method comprises: determining an identity of a unit of data and storing the unit of data in a set of caches, wherein the caches in the set of caches are uniquely associated with the computational nodes in the set of computational nodes, based on the identity of the unit of data.

In specific embodiments of the invention, a system is provided. The system comprises: means for determining an identity of a unit of data and means for storing the unit of data in a set of caches, wherein the caches in the set of caches are uniquely associated with computational nodes in a set of computational nodes, based on the identity of the unit of data.

BRIEF DESCRIPTION OF THE DRAWINGS

The accompanying drawings illustrate various embodiments of systems, methods, and embodiments of various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
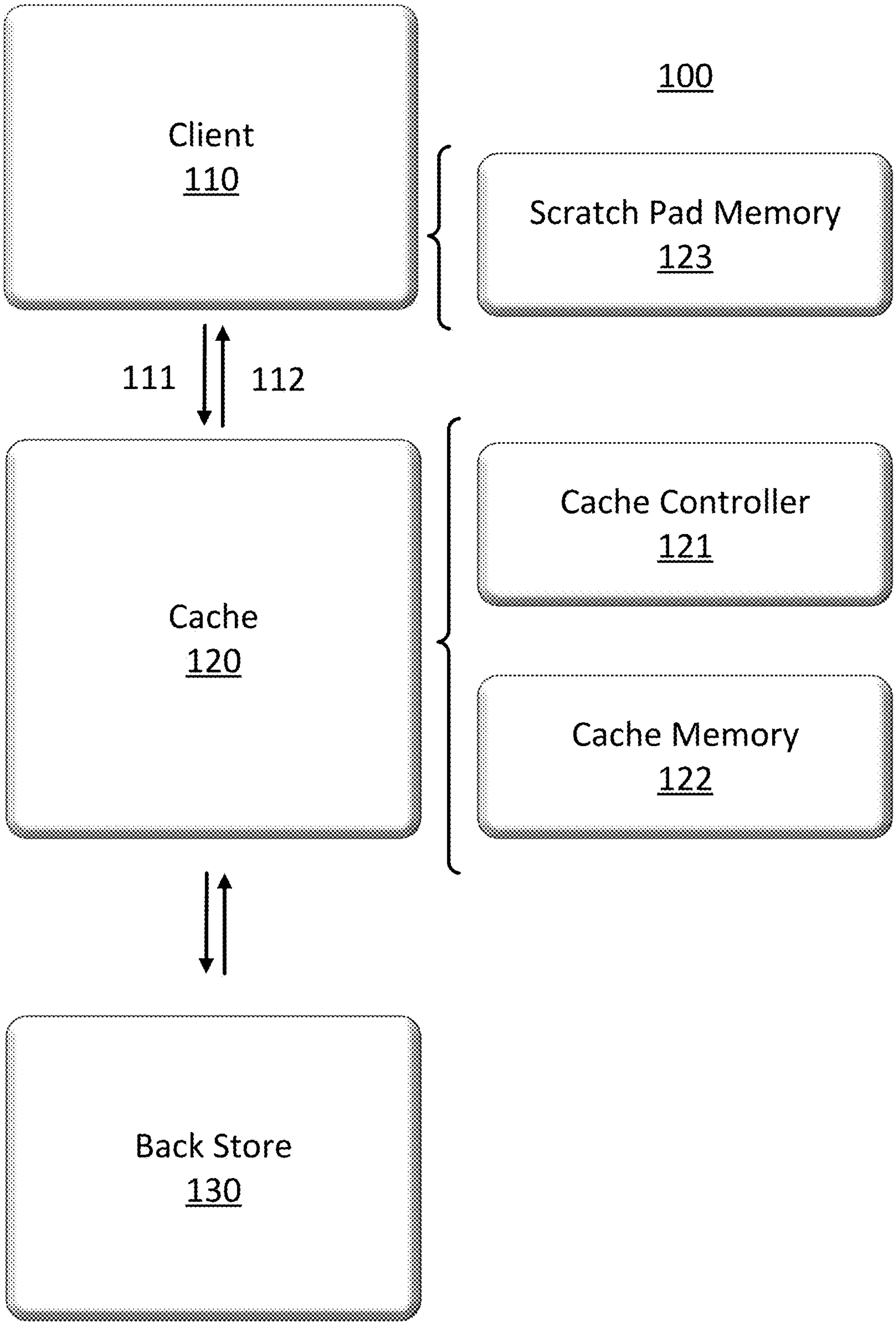
Fig. 1 Related Art
FIG. 1 provides a block diagram of the operation of a cache in accordance with the related art.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods related to caches for networks of computational nodes will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

The approaches disclosed herein are related to caches for sets of computational nodes that are cooperating in the execution of a complex computation such as the execution of a directed graph such as an ANN. The sets of computational nodes can be part of an artificial intelligence accelerator.

The computational nodes can take on various forms. For example, the computational nodes can be any computing unit including a processor or core of a multicore processor. In specific embodiments, the computational nodes can be processing cores in a network on chip (NoC). Although some of the specific examples provided herein are directed to a network of computational nodes in the form of a NoC connecting a set of processing cores, the approaches disclosed herein are broadly applicable to any form of network connecting any form of computational nodes that cooperate to execute a complex computation and that can access a cache to do so. Furthermore, networks in accordance with this disclosure can be implemented on a single chip system, including wafer-scale single chip systems, in a multichip single package system, or in a multichip multipackage system in which the chips are commonly attached to a common substrate such as a printed circuit board (PCB), interposer, or silicon mesh. Networks in accordance with this disclosure can also include chips on multiple substrates linked together by a higher-level common substrate such as in the case of multiple PCBs each with a set of chips where the multiple PCBs are fixed to a common backplane. Networks in accordance with this disclosure can also be implemented in chiplet based systems. For example, in specific embodiments of the invention, one or more computational nodes could be housed or implemented by one or more chiplets, connected, for example, through an interposer.

As used herein the term "interconnect fabric" refers to a hardware and software infrastructure that enables the efficient transfer of data between nodes within a computing system. It facilitates communication by connecting the computational nodes (e.g., processors, accelerators, or memory subsystems) and enabling data exchange within a common address space. This common address space allows nodes to reference and access data consistently, regardless of their physical location. In systems with a shared memory architecture, the interconnect fabric facilitates seamless access to shared memory resources. This allows multiple computational nodes to read from and write to the same memory locations, enabling cooperative processing and data sharing. An interconnect fabric acts as the communication backbone in a computational system, such as those using a NoC, providing the mechanisms for data exchange, synchronization, and shared memory access across a distributed architecture with a unified address space. Interconnect fabrics also include hardware-level integration that directly facilitates data exchange between nodes, often with specialized routing, arbitration, and buffering mechanisms. A NoC is an example of an interconnect fabric.

The data that is used by the computational nodes to execute a computation can take on various forms. The data can be variables in the source code of the complex computation. The data can be tensors used in the execution of a directed graph that is calculated by executing the complex computation. The data can include a layer of an ANN, individual weights or filters of an ANN, accumulation values of a layer of an ANN, inputs of an ANN, and outputs of an ANN. Those of ordinary skill in the art will recognize that a tensor for the execution of a complex computation that implements an ANN can be subject to numerous access requests for composite computations of the complex computation. For example, if the tensor is a layer of the ANN, and the ANN is a convolutional neural network, the same tensor will be accessed numerous times for the execution of numerous composite computations as a filter slides around the tensor to execute the overall convolution. As such, the data is the subject of many access requests and optimizing cache performance for those access requests can provide an accordingly large degree of performance improvement to the execution of the complex computation.

Figure 2:
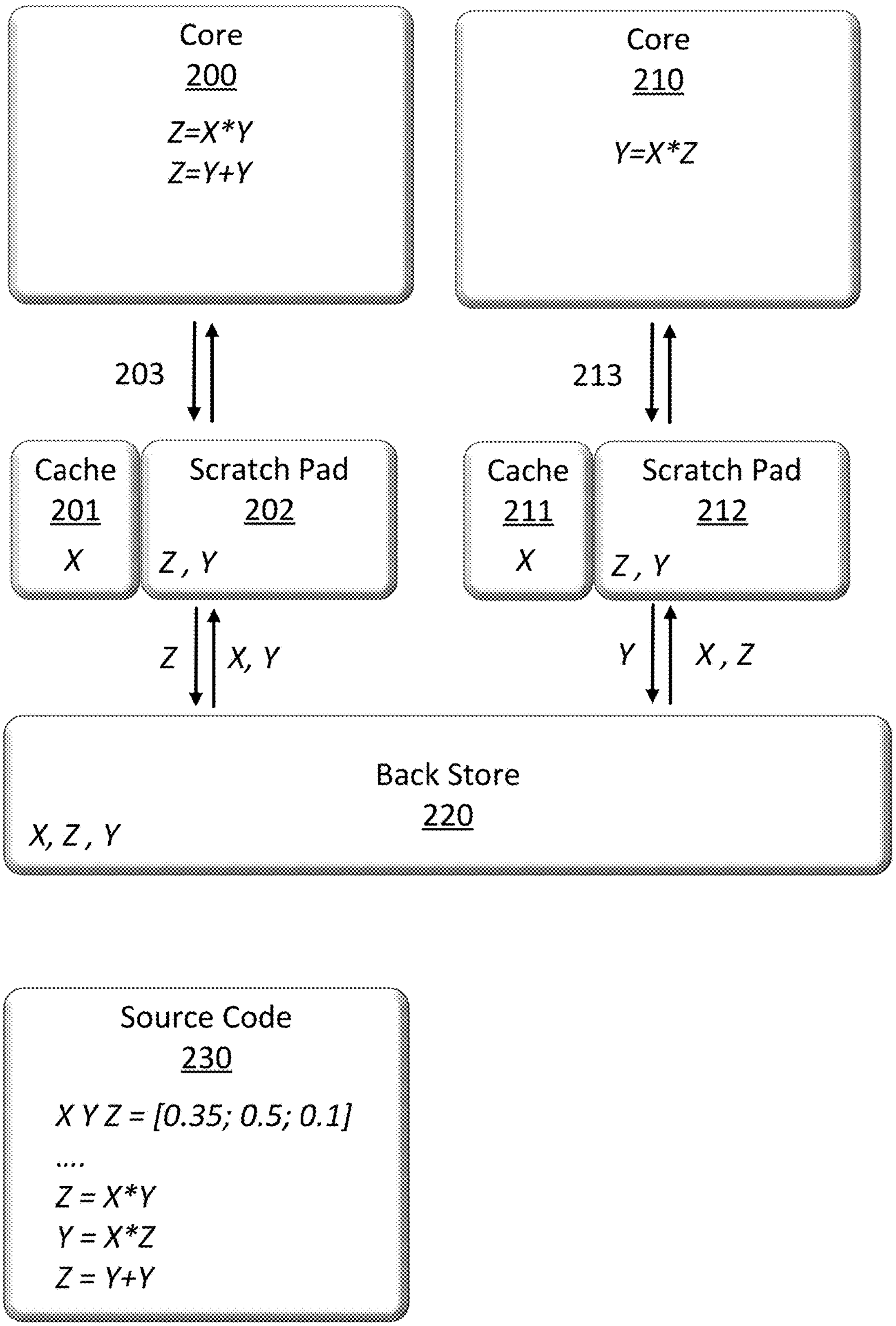
FIG. 2 provides a block diagram of a set of computational nodes that utilize a cache for read-only memory in accordance with specific embodiments of the inventions disclosed herein.

FIG. 2 provides a block diagram of a set of computational nodes that utilize a cache for read-only memory in accordance with specific embodiments of the inventions disclosed herein. In the block diagram, the set of computational nodes are two cores of a multicore processor, core 200 and core

210. The cores are being used to execute a composite computation in which each core is assigned specific component computations. The composite computation can be the execution of an ANN, a cryptographic algorithm, a graphics rendering routine, or some other complex computation. The composite computation can be described by source code such as source code 230. Data may be stored in cache 201 or in cache 211 based on an identity of the data (e.g., a "read-only" status of the data). The identity of the data may be determined by core 200 or core 210.

Each core has access to a first memory and a second memory. Core 200 has access to cache 201 and scratch pad 202. Core 210 has access to cache 211 and scratch pad 212. While the cache and scratch pad have been drawn outside the boundaries of the core, those of ordinary skill will recognize that a processor core can include onboard memory within the core itself such that the illustrated scratch pad and cache can be within the layout of the illustrated core. The cache and the scratch pad can be formed of the same underlying memory and be assigned two different sets of addresses in a common address space. Alternatively, the cache and the scratch pad can be formed of different underlying memory while still being assigned two different sets of addresses in a common address space. In specific embodiments, a cache controller can determine how much of a memory is to be used for the cache and how much is to be used for the scratch pad. The amount of memory attributable to each can be set independently on the different computational nodes. Both cache 201 and cache 211 utilize a common memory as a back store in the form of back store 220 which may be a shared dynamic random-access memory or another cache layer.

The first memory of each core can be used for data generally, including data that changes throughout the course of a composite computation, and the second memory of each core can be used only for read-only data, which does not change throughout the course of a composite computation. For example, the first memory could be a scratch pad memory that is used for execution data when executing an ANN while the second memory is a cache memory that is only used for the network data of that ANN which does not change throughout the execution of the ANN. In specific embodiments, the second memory can also be used for execution data from a layer of the ANN that has been finally calculated (e.g., the final result of a composite computation in which each component computation has been completed). Such values could be the output values of one layer of the ANN and the input values of the next layer.

The system could determine which data is read-only and which data is variable with access to the source code of the composite computation. For example, with reference to source code 230, the compiler could determine that any variable which appears in a single assign statement is read-only and mark variables Z and Y as a variable that should not be stored in read-only memory and mark variable X as a variable that should be stored in read-only memory. Additionally or alternatively, compiled instructions (e.g., for a complex computation to be executed by the cores 200 and 210, and other cores not shown) may mark data or a variable as "read-only" after a portion of the complex computation has been executed. In alternative approaches, a compiler could determine if a value had the potential to change its value through the course of a computation defined by the source code and mark the variable as not to be stored in a read-only memory. In alternative approaches, the source code could include an explicit tag for read-only variables and the compiler could use that tag.

The system could implement a rule that only read-only data can be stored in the caches of the computational nodes such as cache 201 and cache 211. Using this approach, issues with cache coherency problems would be obviated because values would either be available in the cache, and be correct, or not be available and be in the back store. There would not be an issue where the value was in the local cache but was no longer the true value because it had been written elsewhere. Values that can vary through the course of a complex computation would not be stored in the cache. The values could be stored in a local scratch pad while they were being utilized by a computational unit, and then could be written back to the back store or transmitted directly to an alternative core for use when the computations were completed. The values would not be cached and available in an alternative portion of the system, potentially with the wrong value, until those computations were complete and the appropriate value was delivered.

Each core 200 and 210 may distinguish (e.g., be configured to distinguish) read-only data from other data. The distinction that data is read-only data may be considered an identity of the data. The system can be configured to distinguish, and thus only store, read-only data in the cache by maintaining a table of variables that are read-only and accessing the table to determine if a given variable should be stored in the cache. Alternatively, the system can be configured to only store read-only data in a cache by using data packets to store read-only data with headers that indicate the data packets store data that can be stored in the cache. Alternatively, the system can be configured to only store read-only data in a cache by having memory storage instructions compiled for read-only data up front when compiling the instructions for executing a composite computation which instruct the system to only store read-only values in the cache while all other values are not stored in the cache. Regardless of the method of distinguishing read-only data from other data, the system (e.g., cores 200 and 210) may store the read-only data in caches 201 and 211 based on the distinction that the data is read-only.

Embodiments which utilize a cache for read-only values are particularly beneficial in the context of artificial intelligence applications where the trained data that represents the artificial intelligence model is fixed and does not change throughout the course of a complex computation. This data, also called network data, can be required in an unpredictable fashion throughout the network of computational nodes and is often repeatedly accessed which makes it important to have readily available for a given computational node and is thus amenable to caching. At the same time, since this large volume of data does not change, it can be cached across a large network of computational nodes with a facile cache coherency policy thus greatly simplifying the overall memory system. As such, while it is counterintuitive to only cache read-only data, in the context of executing ANNs, the approach produces significant benefits.

In FIG. 2, source code 230 includes three different variables X, Y, and Z. An evaluation of the source code reveals that X is a read-only variable and Y and Z are variables that will be read and written to through the course of the computation. As such, core 200 will engage in transfers 203 with scratch pad 202 and cache 201 that first retrieve variables X and Y and then write variable Z to the scratch pad and then on to back store 220 in order to conduct the operation Z=X*Y. Notably, the write to back store 220 can also be replaced with a transfer of the value Z directly to the next core that needs the data depending upon the implementation. Regardless, only variable X is retained in the cache for later use while the variables that are not read-only are not. Subsequently, core 210 can engage in transfers 213 with scratch pad 212 and cache 211 that first retrieve variables X and Z and then write variable Y to the scratch pad and then on to back store 220 to conduct the operation Y=X*Z. Subsequently, core 200 can conduct a third operation in which, if Y had been stored in cache 201 instead of in scratch pad 202 and then on to back store 220, a cache coherency issue may have arisen. However, since core 200 will know that the data in scratch pad 202 is not valid, it will access back store 220 to retrieve the current value for Y in order to conduct the final computation. As noted, specific values can become read-only through the course of a complex computation such that they can subsequently, after becoming read-only values, be stored in the cache.

Figure 3:
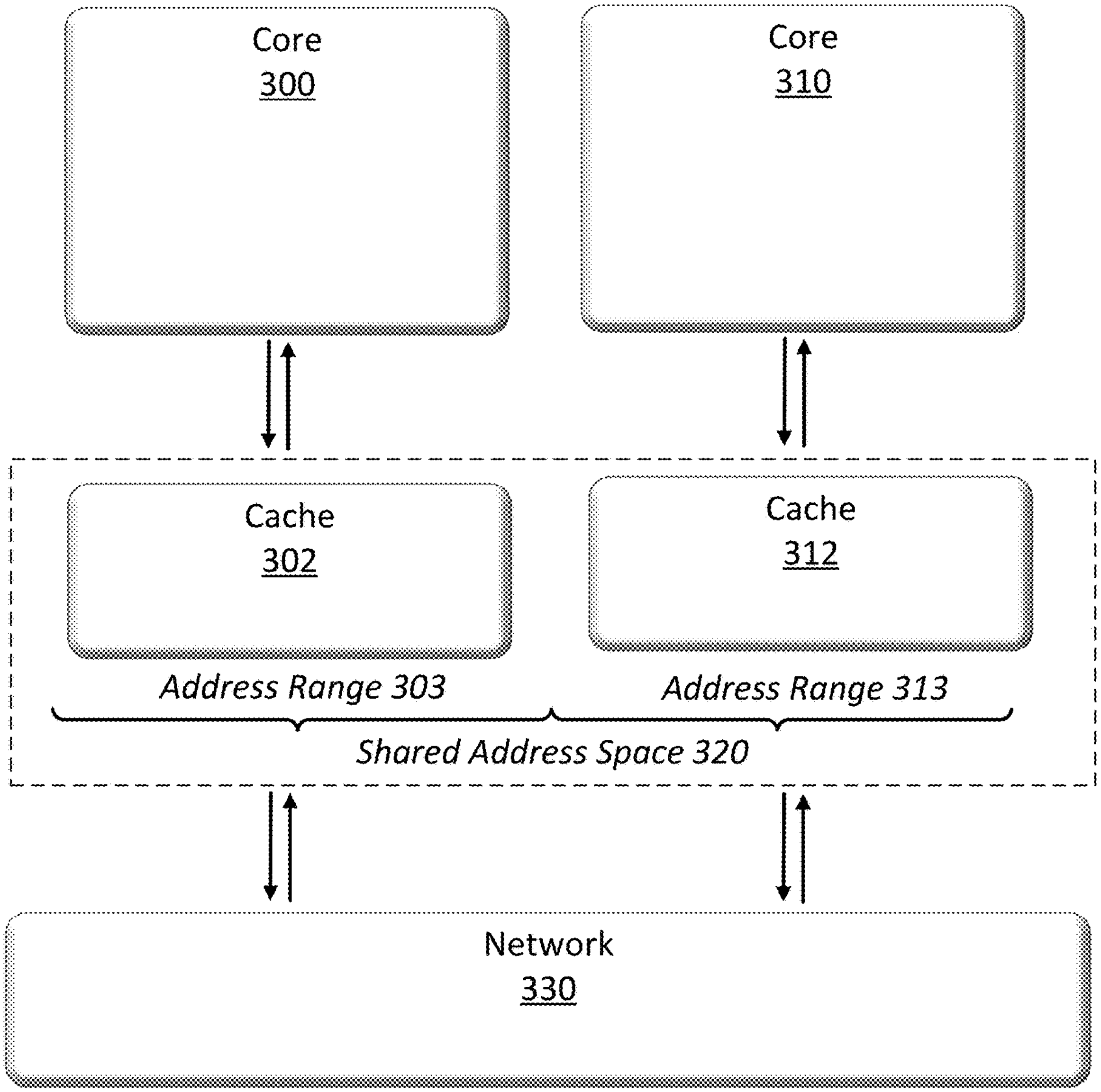
FIG. 3 provides a block diagram with a set of computational nodes in which the cache of each computational node is assigned a unique address range from a shared address space in accordance with specific embodiments of the inventions disclosed herein.

FIG. 3 provides a block diagram with a set of computational nodes in the form of processing core 300 and processing core 310 in accordance with specific embodiments of the inventions disclosed herein. The processing cores are cooperatively executing a composite computation where each processing core has access to a memory for reading and writing data used in the composite computation. The memory for core 300 includes cache 302. The memory for core 310 includes cache 312. The illustrated caches are uniquely associated with their computational nodes. As illustrated, the cache of each computational node is assigned a unique address range from a shared address space. The shared address space can be a global address space shared by core 300 and core 310. Shared address space 320 has been broken into address range 303, which is associated with cache 302, and address range 313, which is associated with cache 312. Address range 303 may be addresses 0 to 999 while address range 313 may be addresses 1000 to 1999 where the shared address space 320 has 2000 addresses. Data may be stored in cache 302 or in cache 312 based on an identity of the data (e.g., an address or address range associated with the data). The identity of the data may be determined by core 300 or core 310.

The cache policy used by caches 302 and 312 can be set such that the system will only write certain data to a given address. For example, a variable A will always be stored at address 0. As such, when core 300 needs to write a value for variable A it can conduct a local write to cache 302. However, when core 310 needs to write a value for variable A, core 310 may send a write message through network 330 for the value to be written to cache 302. This approach mitigates problems with cache coherency because there is only one place in which the data can be written across all the caches. The address of the data may be considered an identity of the data.

The cache policy used by caches 302 and 312 can be set such that only core 300 has write access to cache 302 and only core 310 has write access to cache 312. As such, all the data written by core 300 must fit in address range 303 and all the data written by core 310 must fit in address range 313. This approach mitigates problems with cache coherency because data associated with a given address can only be written by one core thus obviating the root cause of cache coherency failures where multiple nodes can write different values for a given variable.

The system can keep track of which variables are stored in which addresses using a fixed mapping that is set when the computational nodes are first initialized for a composite computation or using a variable mapping that can change through the course of a composite computation. The mapping can be stored in a table that is maintained by all the cores independently. Alternatively, each core can maintain a mapping of which variables are stored in which local addresses while all other variables are assumed to be remotely stored and a mapping that is accessible to the network or a memory controller maintains the table for the remotely stored variables. The mapping can be maintained in software such that the address ranges associated with different caches can be modified in size depending upon whether the memory that is used to instantiate the caches needs to be used for other purposes such as being assigned to be used as a scratch pad for a core. Setting the mapping can also involve allocating specific address ranges for specific cores based on how much data they will need to write to the cache with a core that is going to produce more writes being given a larger address range.

The system can assign variables to specific address ranges intelligently to minimize remote writes and reads. For example, the variables that each core would write could be assigned to addresses in the cache associated with that core. As another example, if core 300 were producing outputs that were meant to be used by core 310 in a next stage of the composite computation, the outputs from core 300 could be assigned to address range 313 such that the remote writes of the finalized output data would happen a single time while the numerous reads that would be executed by core 310 when using that data would all be local cache reads of cache 312. As another example, if core 300 were producing outputs that would be used by core 300 alone, the variables could be associated with address range 303 to eliminate the need for remote reads and writes. A compiler operating on a source code description of the composite computation could assign the address ranges automatically to implement these kinds of beneficial assignments. Alternatively, the address ranges could be specified in source code by a developer with an understanding of how to minimize remote reads and writes.

Figure 4:
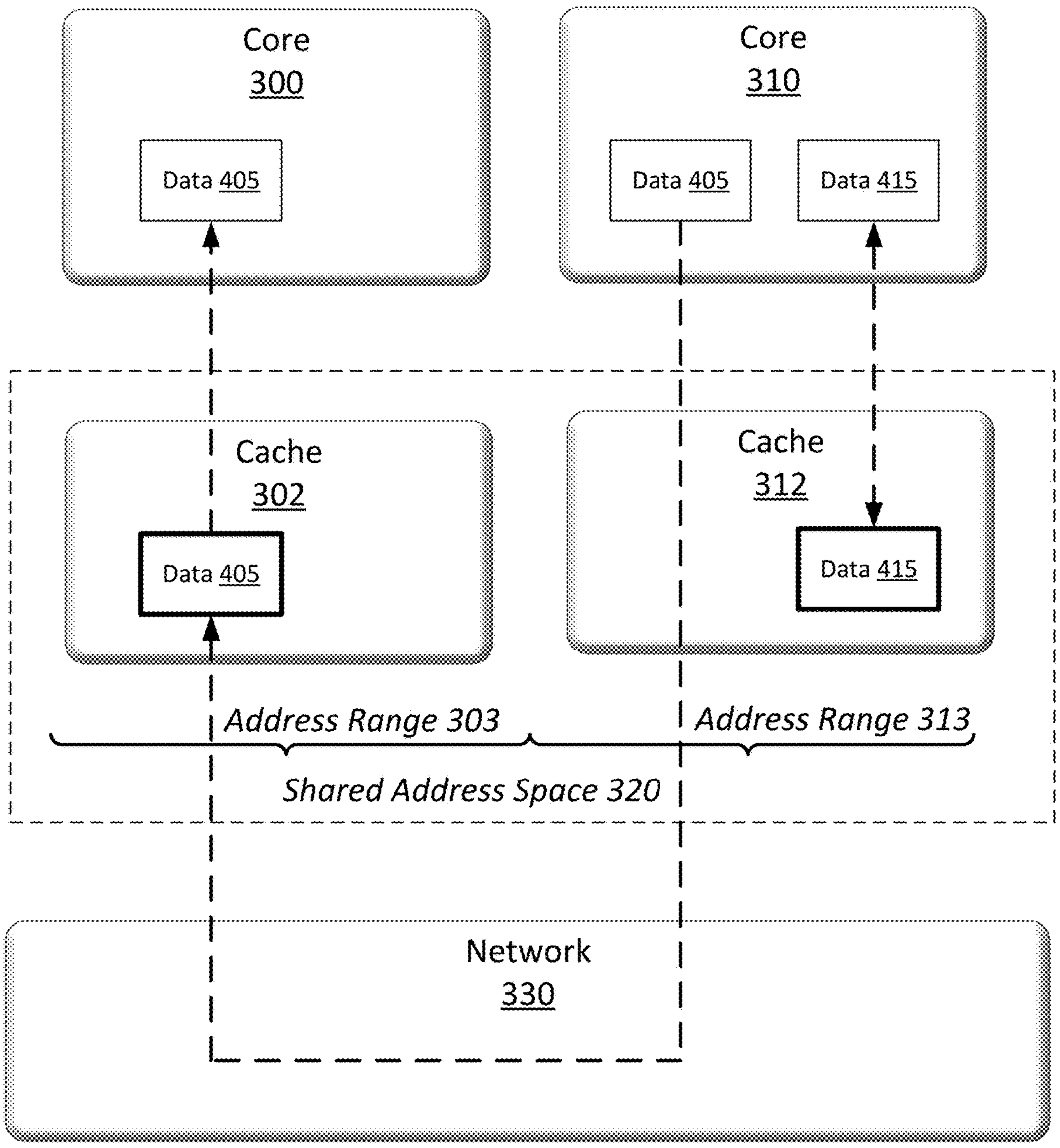
FIG. 4 provides examples of assigning variables to specific addresses to minimize remote writes and reads in accordance with specific embodiments of the inventions disclosed herein.

FIG. 4 illustrates examples of assigning variables to specific addresses to minimize remote writes and reads in accordance with specific embodiments of the inventions disclosed herein. Core 300 and core 310 may be examples of computational nodes. Cores 300 and 310, along with other cores not shown, may constitute a set of computational nodes. The memory for core 300 includes cache 302. The memory for core 310 includes cache 312. The illustrated caches are uniquely associated with their computational nodes. As illustrated, the cache of each computational node is assigned a unique address range from shared address space 320. Shared address space 320 can be a global address space shared by core 300 and core 310 and may be broken into address range 303, which is associated with cache 302, and address range 313, which is associated with cache 312.

In the example of FIG. 4, the variables that core 310 writes are assigned to addresses in the cache associated with the core that may most use (e.g., read) the variable. A compiler operating on a source code description of the composite computation could assign the address ranges automatically to implement assignments that reduce the frequency of remote reads and writes. Alternatively, the address ranges could be specified in source code by a developer with an understanding of how to minimize remote reads and writes.

Core 310 may output data 405 that may be used by core 300 in a next stage of the composite computation. Data 405 may be assigned to address range 303 such that the remote write of data 405 would happen a single time while the numerous reads of data 405 that would be executed by core 300 would all be local cache reads of cache 302. Data 405 may be stored in cache 302 (e.g., using address range 303)

and used as an input to core 300. An identity of data 405 may be associated with address range 303. Core 310 may determine (e.g., may be configured to determine) the identity of data 405 and store data 405 in address range 303 based on the identity of data 405 being associated with address range 303.

As another example, core 310 may output data 415, which may be used by core 310 alone. Data 415 may be associated with address range 313 to eliminate the need for remote reads and writes. Data 415 may be stored in cache 312 (e.g., using address range 313) and used as an input to core 310. An identity of data 415 may be associated with address range 313. Core 310 may determine (e.g., may be configured to determine) the identity of data 415 and store data 415 in address range 313 based on the identity of data 415 being associated with address range 313.

Figure 5:
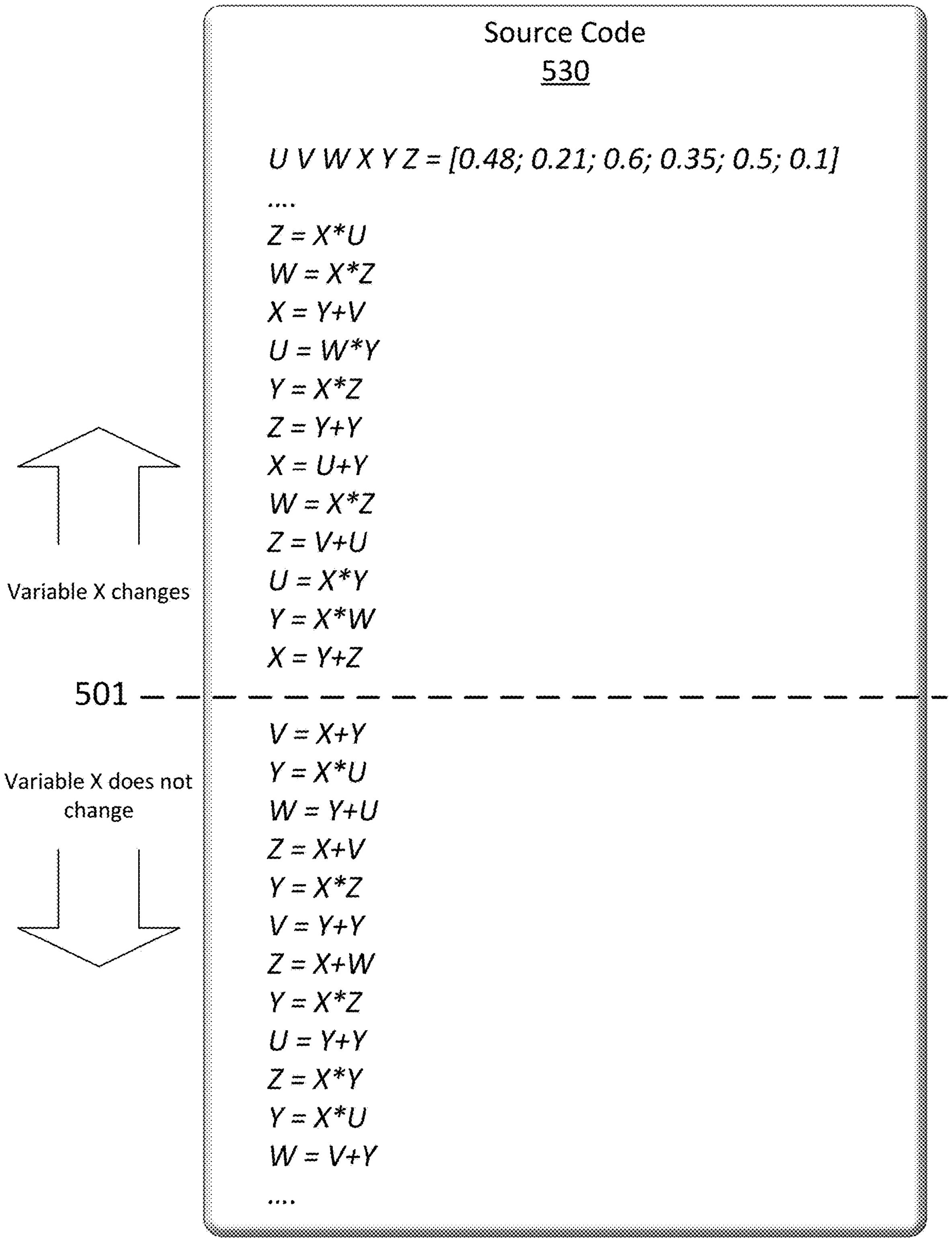
FIG. 5 provides an example of a source code in which a variable becomes read-only data after a first portion of the source code is executed in accordance with specific embodiments of the inventions disclosed herein.

FIG. 5 illustrates an example of source code 530 in which variable X becomes read-only data at point 501 in accordance with specific embodiments of the inventions disclosed herein. A set of computational nodes (e.g., cores) may be configured to execute a complex computation using source code 530. Although the example of source code 530 includes six different variables U, V, W, X, Y, and Z, a source code may include any quantity of different variables. Each computational node (e.g., core) may be configured to, when storing data in memory, determine an identity of the data, determine if a value of the data is fixed for a remainder of the complex computation, and store the data in the cache memory based on the determination that the value is fixed for the remainder of the complex computation. For example, an evaluation of source code 530 may reveal that each variable U, V, W, X, Y, and Z will be read and written to through the course of the complex computation; however, variable X is effectively a read-only variable after point 501. That is, variable X is no longer redefined or rewritten and is only used as an operand or read value in the remaining portion of source code 530.

Before point 501, variable X may be changed. As such, for computations such as Z=X*U (e.g., the first computation shown in source code 530), the core executing the computation may retrieve variable X (and variable U) from a back store, not a cache. For computations such as X=Y+V (e.g., the third computation shown in source code 530), the resulting variable X may be stored in the back store, not a cache. For computation X=Y+Z (e.g., the last computation before point 501), the resulting X value may be stored in the cache, as the resulting X value may be the final, nonchanging, value of X. Accordingly, variable X may be considered read-only data after point 501 of the execution of the complex computation, as it is no longer rewritten over the course of the remainder of source code 530.

After point 501, variable X may not change and may be designated read-only data. A core may engage in a transfer with a scratch pad to retrieve variable Y and a transfer with the cache to retrieve variable X. The core may then, after performing the computation, write variable V to the scratch pad and then on to a back store in order to conduct the operation V=X+Y, which is the first operation after point 501. In specific embodiments, the write to the back store may be replaced with a transfer of the value V directly to the next core that needs the data depending upon the implementation. Regardless, only variable X is retained in the cache for later use while the variables that are not read-only are not. Variable X becomes read-only data through the course of source code 530 (e.g., a complex computation) such that variable X may subsequently, after becoming read-only, be stored in the cache. With read-only status, variable X may be stored in multiple caches associated with multiple cores or computational nodes.

The data represented by variables U, V, W, X, Y, and Z may be execution data from a layer of the ANN. After point 501, the variable X has been finally calculated (e.g., the final result of variable X in the composite computation in which each component computation setting X to a new value has been completed). Variable X could be the output value of one layer of the ANN and the input value of the next layer. By storing only read-only variables, including variable X once its final value is computed, in cache, cache coherence problems for the cache are obviated. For example, there is no chance that a computational node will read the wrong value from the cache because a local instance of that value will always be the true value since the value does not change throughout the course of the remainder of the composite computation once the variable is classified as read-only.

The system using source code 530 may determine which data is read-only and which data is variable. For example, with reference to source code 530, a compiler could determine that any variable which appears in a single assign statement is read-only and mark these variables as variables that should be stored in read-only memory. In alternative approaches, the compiler could determine if a variable had the potential to change its value through the course of the computations defined by source code 530 and mark these variable (e.g., variables U, V, W, Y, and Z, with variable X only marked as changeable during the first portion of source code 530) as not to be stored in a read-only memory. The variables that change their values may be stored in a local scratch pad while they were being utilized by a computational unit, and then could be written back to the back store or transmitted directly to an alternative core for use when the computations were completed. In alternative approaches, source code 530 could include an explicit tag for read-only variables and the compiler could use that tag.

Once a variable is set in a source code, the variable may be considered "read-only." For example, variable X may be "read-only" after point 501 in source code 530. Compiled instructions for a complex computation may mark the data (e.g., relating to variable X) as read-only after a portion of the complex computation has been executed (e.g., the portion before point 501). The instructions may be for a set of computational nodes (e.g., cores) to execute a complex computation. The system can add variable X to a table of variables that are read-only, where the table is accessed to determine if a given variable should be stored in the cache. Alternatively, once variable X is designated as "read-only," data packets carrying variable X may include headers that indicate that the data packets store data that can be stored in the cache. Alternatively, the system may compile memory storage instructions for read-only data up front, when compiling the instructions for executing a composite computation, which instruct the system to only store read-only values in the cache and instruct the system that variable X counts as "read-only" after point 501 in source code 530.

Figure 6:
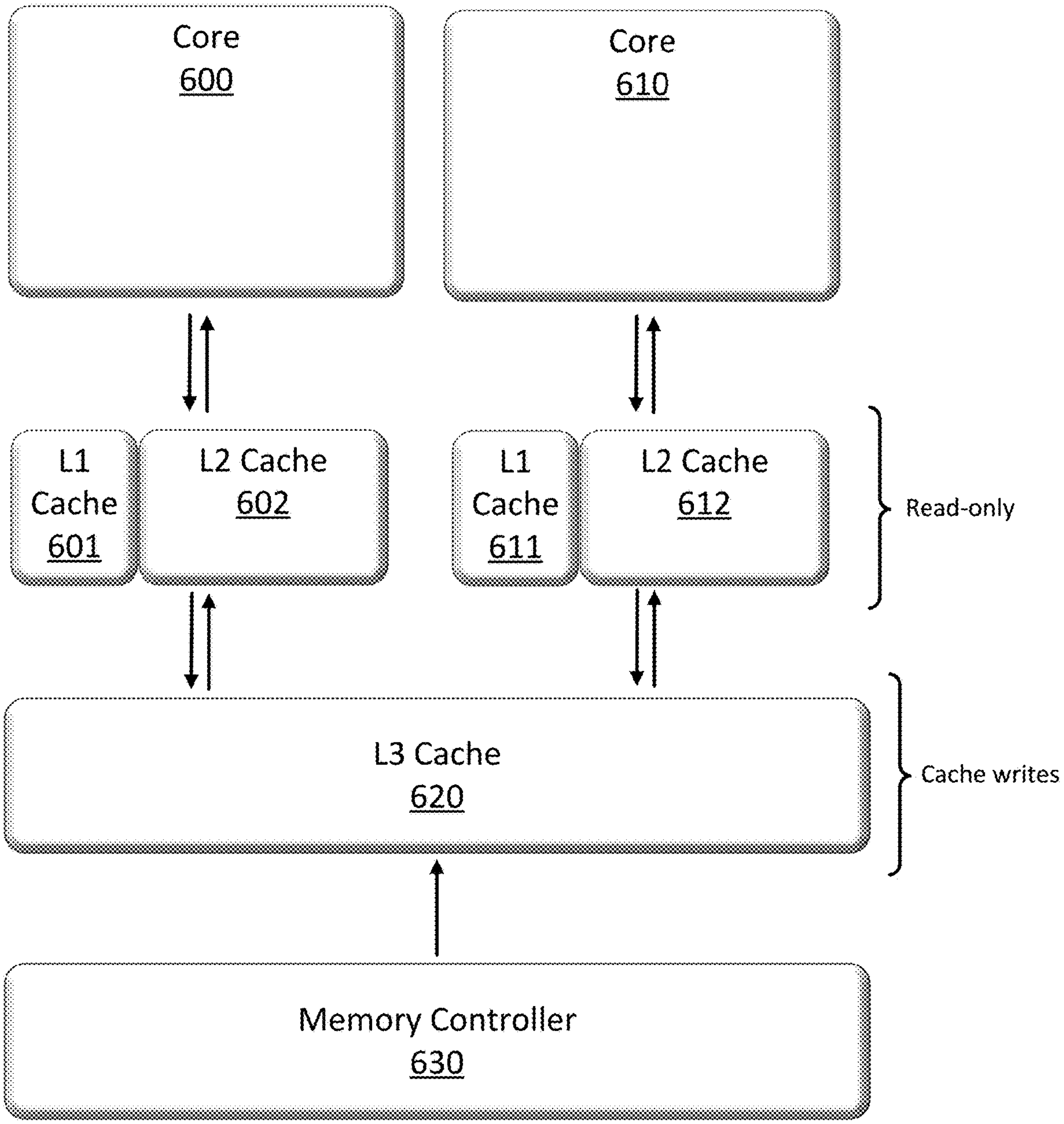
FIG. 6 provides a block diagram of a set of computational nodes with private first level (L1) and second level (L2) caches and a shared third level (L3) cache in accordance with specific embodiments of the inventions disclosed herein.

FIG. 6 provides a block diagram of a set of computational nodes with private first level (L1) and second level (L2) caches and a shared third level (L3) cache in accordance with specific embodiments of the inventions disclosed herein. In the block diagram, the set of computational nodes are two cores of a multicore processor, core 600 and core 610. The cores may be used to execute a composite computation in which each core is assigned specific component computations. The composite computation can be the execution of an ANN, a cryptographic algorithm, a graphics rendering routine, directed graph, or some other complex computation. The composite computation can be described by a source code. Cores 600 and 610 may be part of an artificial intelligence accelerator.

Each core 600 and 610 has access to an L1 cache, an L2 cache, and an L3 cache. Core 600 has access to L1 cache 601 and L2 cache 602. Core 610 has access to L1 cache 611 and L2 cache 612. That is, L1 cache 601, L2 cache 602, L1 cache 611, and L2 cache 612 may each be uniquely associated with their respective core. Both core 600 and core 610 have access to L3 cache 620. While the caches have been drawn outside the boundaries of the respective cores, those of ordinary skill will recognize that a processor core can include caches within the core itself such that the illustrated caches can be within the layout of the illustrated cores. Data may be stored in an L1 cache, an L2 cache, or L3 cache 601 based on an identity of the data (e.g., whether the data is read-only, an assigned address of the data, etc.).

L3 cache 620 may be shared by core 600 and core 610; L3 cache 620 may act as a common memory (e.g., back store) for caches 601, 602, 611, and 612. L3 cache may act as an intermediary between the L1/L2 caches and a main memory. Memory controller 630 may directly administrate L3 cache 620. Memory controller 630 may have direct control over the management and operation of L3 cache 620 rather than relying solely on the individual cores 600 and 610 or their private caches (e.g., L1 caches 601 and 611, L2 caches 602 and 612). Memory controller 630 may manage access to the system's main memory. For example, memory controller 630 may perform functions related to cache allocation, eviction policies, data prefetching, and access arbitration for L3 cache 620. Memory controller 630 may allow a centralized and holistic measurement of the resources of L3 cache 620.

A caching policy of cores 600 and 610 may route all cache writes to L3 cache 620. For example, during the execution of a complex computation, L1 cache 601, L2 cache 602, L1 cache 611, and L2 cache 612 may only store read-only data, while writes performed as part of the complex computation may be routed to L3 cache 620. Core 600 and 610 may, accordingly, have access to the same storage space for changeable values.

The data stored in L1 cache 601, L2 cache 602, L1 cache 611, and L2 cache 612 may be trained data of an artificial intelligence model. Trained data may refer to internal data representations, weights, or parameters that the artificial intelligence model learns and stores after being trained on training data. Trained data may represent the distilled knowledge that the model has extracted from the training data, which knowledge may be encoded in the model's architecture (e.g., neural network weights, decision tree structures, model parameters, embeddings, rules). For example, the data stored in L1 cache 601, L2 cache 602, L1 cache 611, and L2 cache 612 may be weights in a traditional artificial neural network (e.g., weight matrices and bias terms), filters in a convolutional neural network, probability distributions (e.g., learned by a Bayesian model), or support vectors and hyperplanes in a support vector machine. Embodiments which utilize L1 cache 601, L2 cache 602, L1 cache 611, and L2 cache 612 for read-only values may be particularly beneficial in the context of artificial intelligence applications where the trained data that represents the artificial intelligence model is fixed and does not change throughout the course of a complex computation. This data, also called network data, can be required in an unpredictable fashion throughout the network of computational nodes (e.g., including cores 600 and 610) and is often repeatedly accessed, which makes it important to have readily available for a given computational node and is thus amendable to caching. At the same time, since this large volume of data does not change, it can be cached across a large network of computational nodes with the cache coherency policy of routing all cache writes to L3 cache 620, greatly simplifying the overall memory system and mitigating cache coherency issues.

Figure 7:
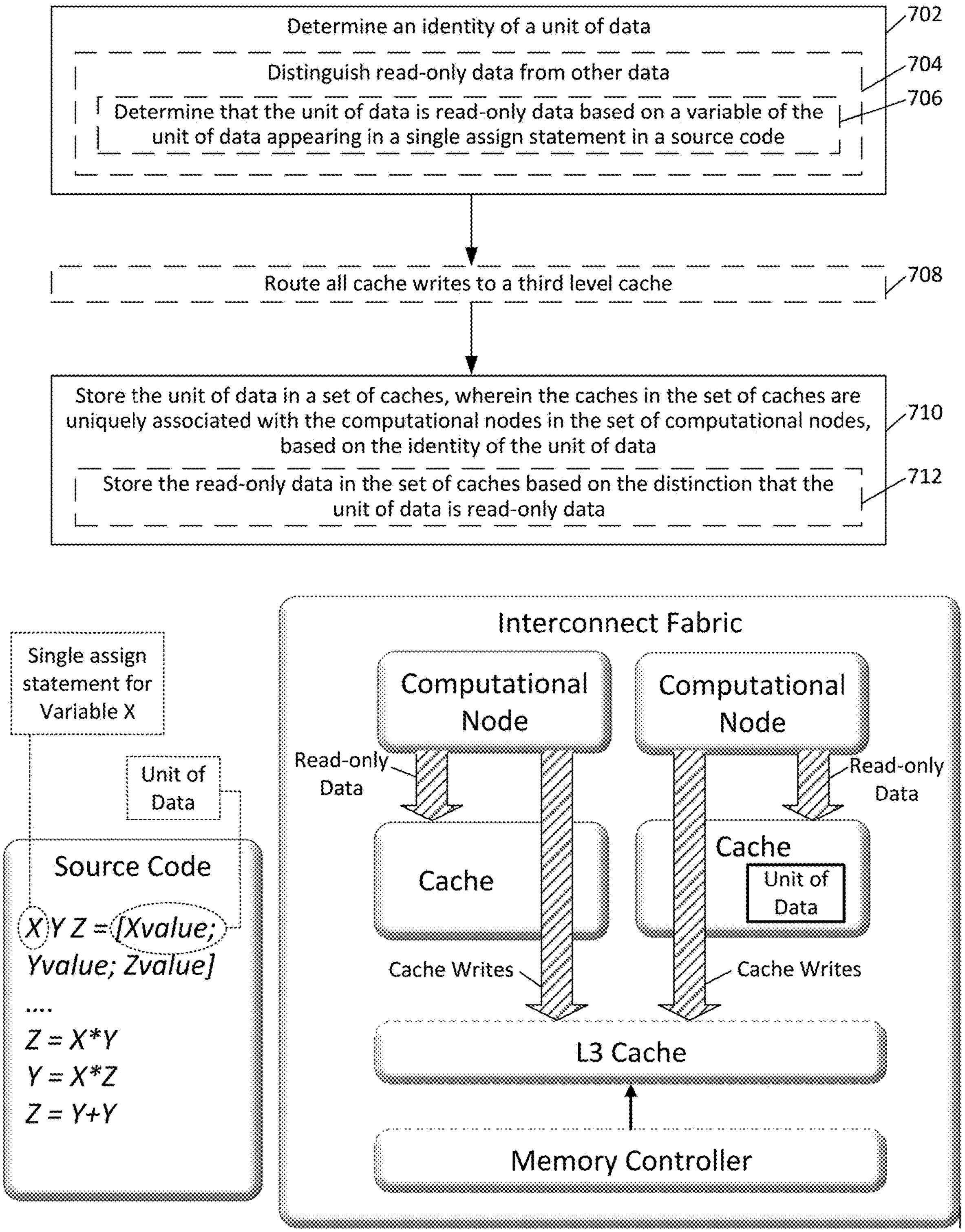
FIG. 7 provides an example of a method of storing a unit of data in a set of caches based on an identity of the unit of data in accordance with specific embodiments of the inventions disclosed herein.

FIG. 7 illustrates an example of method 700 of storing a unit of data in a set of caches based on an identity of the unit of data in accordance with specific embodiments of the inventions disclosed herein. Each step of method 700 may be conducted by a set of computational nodes that are networked by an interconnect fabric. Method 700 may be implemented by a system including means for performing the steps of method 700. Method 700 may be implemented by a system including a set of computational nodes, an interconnect fabric, and a set of caches. In specific embodiments, the system may also include compiled instructions, a set of address ranges, a memory controller, and a third level cache. Steps, or portions of steps, of method 700 may be duplicated, omitted, rearranged, or otherwise deviate from the form shown. Additional steps may be added to method 700. The steps of method 700 may be performed in series, in parallel, or may overlap.

At step 702, an identity of a unit of data may be determined. In specific embodiments, the identity of the unit of data may be an address of the unit of data. In specific embodiments, the identity of the unit of data may be a read-only status of the unit of data. In specific embodiments, the unit of data may be trained data of an artificial intelligence model. For example, the unit of data may refer to weights in a traditional artificial neural network or filters in a convolutional neural network.

In specific embodiments and as part of determining the identity of the unit of data, at step 704, read-only data may be distinguished from other data. In specific embodiments, the system may distinguish read-only data by maintaining a table of variables that are read-only and accessing the table to determine if a given variable should be stored in the cache. In specific embodiments, the system may distinguish read-only data by using data packets to store read-only data with headers that indicate the data packets store data that can be stored in the cache. In specific embodiments, the system may distinguish read-only memory by having compiled instructions that mark data as read-only. In specific embodiments, the system may distinguish read-only memory by determining, by a compiler, if a value had the potential to change its value through the course of a computation defined by the source code and mark the changeable variable as not to be stored in a read-only memory. In specific embodiments, the source code may include an explicit tag for read-only variables and the compiler could use that tag.

In specific embodiments and as part of distinguishing read-only data from other data, at step 706, the unit of data may be determined to be read-only data based on a variable of the unit of data appearing in a single assign statement in a source code. In specific embodiments, a compiler may determine that the variable of the unit of data appears in a single assign statement and may mark the unit of data as read-only or may mark the variable as a variable to be stored in cache.

In specific embodiments, at step 708, all cache writes may be routed to a third level cache. The third level cache may be shared by the computational nodes in the set of computational nodes. The third level cache may be directly administered by a memory controller. First and second level caches may be only used for reads, and not writes.

At step 710, the unit of data may be stored in a set of caches. The caches in the set of caches may be uniquely associated with the computational nodes in the set of computational nodes. The unit of data may be stored in the set of caches based on the identity of the unit of data (e.g., determined at step 702).

In specific embodiments and as part of storing the unit of data, at step 712, the read-only unit of data may be stored in the set of caches based on the distinction that the unit of data is read-only (e.g., distinguished at step 704). By storing the unit of data based on the read-only status (e.g., the identity) of the unit of data, cache coherence problems for the cache are obviated as there is no chance that a computational node will read the wrong value from the cache because a local instance of that value will always be the true value since the value does not change through the course of the composite computation.

In specific embodiments, method 700 may be implemented by a system including means for performing each step. The means may include or be implemented on or using one or more processors, microprocessors, embedded processors, digital signal processors, media processors, multiprocessors, controllers, microcontrollers, processing cores, chiplets, integrated circuits, busses, addressable busses, wires, couplings, wireless communications, memory (e.g., DRAM, SRAM, cache, registers, etc.), logic, amplifiers, network interface controllers (NICs), code, etc. More specific means associated with each step of method 700 are provided below.

For example, step 702 (e.g., determining an identity of a data unit) may be performed using a means for determining an identity of a data unit. The means for determining an identity of a data unit can include logic and memory. For example, memory could be back store 220 or a part of network 330. The means for determining an identity of a data unit could include comparators and decoders. The means for determining an identity of a data unit could include the hardware features mentioned above configured to maintain a table of variables that identify a characteristic of the unit of data (e.g., a read-only status or an address). The hardware features mentioned above could also be configured to use data packets to store the unit of data with a header that indicates the identity of the data.

For example, step 704 (e.g., distinguishing read-only data from other data) may be performed using a means for distinguishing read-only data from other data. The means for distinguishing read-only data from other data can include memory and logic. For example, memory could be back store 220 or a part of network 330. The means for distinguishing read-only data from other data could include comparators and decoders. The means for distinguishing read-only data from other data could include the hardware features mentioned above configured to access a table of variables to determine if a given variable is read-only. The hardware features mentioned above could also be configured to use data packets to store read-only data with headers that indicate the data packets store read-only data.

For example, step 706 (e.g., determining that the unit of data is read-only based on a variable of the unit of data appearing in a single assign statement in a source code) may be performed using a means for determining that the unit of data is read-only. The means for determining that the unit of data is read-only can include a central processing unit. The means for determining that the unit of data is read-only could include memory to store source code, logs, and analysis databases. For example, the memory could be back store 220 or a part of network 330. The means for determining that the unit of data is read-only could include the hardware features mentioned above configured to use static analysis to parse the source code and identify assignments programmatically. The hardware features mentioned above could also be configured to perform lexical analysis, syntactic analysis, semantic analysis, pattern matching, data flow analysis, and/or control flow analysis on the source code.

For example, step 708 (e.g., routing all cache writes to a third level cache) may be performed using a means for routing all cache writes to a third level cache. The means for routing all cache writes to a third level cache can include a cache controller and a write buffer. For example, the cache controller could be memory controller 630. The means for routing all cache writes to a third level cache could include a ring bus, a mesh network, or a crossbar switch. The means for routing all cache writes to a third level cache could include the hardware features mentioned above configured to temporarily store write data to reduce latency and group writes into efficient transactions. The hardware features mentioned above could also be configured to interconnect computational nodes and caches.

For example, step 710 (e.g., storing the unit of data in a set of caches) may be performed using a means for storing the unit of data in a set of caches. The means for storing the unit of data in a set of caches can include memory cells, bitlines, wordlines, and sense amplifiers. For example, the memory cells, bitlines, wordlines, and sense amplifiers could be components of caches 201, 211, 302, 312, 601, 602, 611, 612, and 620. The means for storing the unit of data in a set of caches could include tag arrays, data arrays, and write buffers. The means for storing the unit of data in a set of caches could include the hardware features mentioned above configured to transfer the unit of data to and from memory cells. The hardware features mentioned above could also be configured to store metadata about the unit of data and store the unit of data itself.

For example, step 712 (e.g., storing the read-only data in the set of caches based on the distinction that the unit of data is read-only data) may be performed using a means for storing the read-only data. The means for storing the read-only data can include a compiler. The means for storing the read-only data could include metadata, tags, comparators, and decoders. The means for storing the read-only data could include the hardware features mentioned above configured to mark data or a variable as "read-only." The hardware features mentioned above could also be configured to have memory storage instructions compiled for read-only data up front (when compiling the instructions for executing a composite computation) which instruct the system to only store read-only values in the cache while all other values are not stored in the cache.

Figure 8:
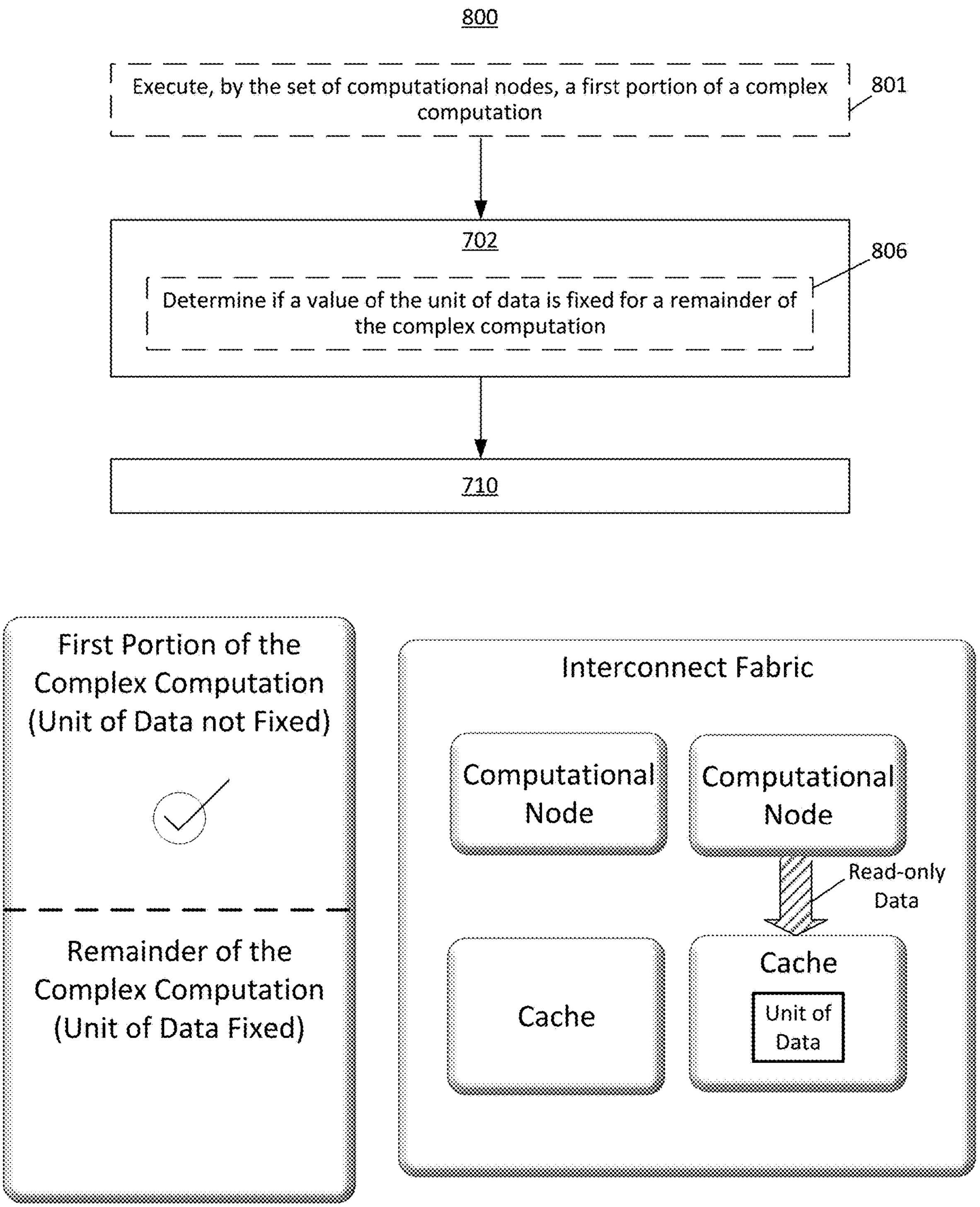
FIG. 8 provides an example of a method of storing a unit of data in a set of caches based on a new read-only identity of the unit of data in accordance with specific embodiments of the inventions disclosed herein.

FIG. 8 illustrates an example of method 800 of storing a unit of data in a set of caches based on a new read-only identity of the unit of data in accordance with specific embodiments of the inventions disclosed herein. Each step of method 800 may be conducted by a set of computational nodes that are networked by an interconnect fabric. Method 800 may be implemented by a system including means for performing the steps of method 800. Method 800 may be implemented by a system including a set of computational nodes, an interconnect fabric, and a set of caches. In specific embodiments, the system may also include compiled instructions, a set of address ranges, a memory controller, and a third level cache. Steps, or portions of steps, of method 800 may be duplicated, omitted, rearranged, or otherwise deviate from the form shown. Additional steps may be added to method 800. The steps of method 800 may be performed in series, in parallel, or may overlap. Aspects and steps of method 700, including steps 702 and 710, may be implemented in method 800.

In specific embodiments, at step 801, a first portion of a complex computation may be executed. The first portion of the complex computation may be executed by the set of computational nodes. In specific embodiments, the unit of data may be changeable during the first portion of the complex computation. After step 801, method 800 may proceed to step 702.

At step 702, an identity of a unit of data may be determined. In specific embodiments, the identity of the unit of data may be a read-only status of the unit of data. In specific embodiments, the unit of data may only be "read-only" for the remainder of the complex computation (e.g., not the first portion). In specific embodiments, step 702 may occur before step 801 (e.g., the identity, or an anticipated change in identity, of a unit of data may be determined before the first portion of the complex computation is executed).

In specific embodiments and as part of determining the identity of the unit of data, at step 806, if the value of the unit of data is fixed for the remainder (e.g., after the first portion) of the complex computation may be determined. In specific embodiments, the unit of data may be determined to be read-only data based on a variable of the unit of data appearing in assign statements in the first portion of the complex computation (e.g., a source code) but not in assign statements (e.g., not be reassigned) in the remainder of the complex computation. In specific embodiments, a compiler may determine that the variable of the unit of data appears in single assign statements only in the first portion of the complex computation and may mark the unit of data as read-only or may mark the variable as a variable to be stored in cache. In specific embodiments, compiled instructions may mark the unit of data as "read-only" after the first portion of the complex computation has been executed. After optional step 806, method 800 may proceed to step 710.

At step 710, the unit of data may be stored in a set of caches. The caches in the set of caches may be uniquely associated with the computational nodes in the set of computational nodes. The unit of data may be stored in the set of caches based on the identity of the unit of data (e.g., determined at step 702). In specific embodiments the read-only unit of data may be stored in the set of caches based on the distinction that the unit of data is fixed (e.g., read-only) for the remainder of the complex computation. In specific embodiments, the unit of data may be stored as part of the execution of a second portion or a remainder of the complex computation. By storing the unit of data based on the read-only status (e.g., the identity) of the unit of data, cache coherence problems for the cache are obviated as there is no chance that a computational node will read the wrong value from the cache because a local instance of that value will always be the true value since the value does not change through the remainder of the composite computation.

In specific embodiments, method 800 may be implemented by a system including means for performing each step. The means may include or be implemented on or using one or more processors, microprocessors, embedded processors, digital signal processors, media processors, multiprocessors, controllers, microcontrollers, processing cores, chiplets, integrated circuits, busses, addressable busses, wires, couplings, wireless communications, memory (e.g., DRAM, SRAM, cache, registers, etc.), logic, amplifiers, network interface controllers (NICs), code, etc. More specific means associated with each step of method 800 are provided below.

For example, step 801 (e.g., executing a first portion of a complex computation) may be performed using a means for executing a first portion of a complex computation. The means for executing a first portion of a complex computation can include one or more arithmetic logic units, floating-point units, registers, control units. The means for executing a first portion of a complex computation could include specialized accelerators such as field programmable gate arrays (FPGAs) tensor processing units (TPUs), and digital signal processors (DSPs). The means for executing a first portion of a complex computation could include the hardware features mentioned above configured to prepare data (e.g., preprocessing, parsing, filtering). The hardware features mentioned above could also be configured to execute computational tasks and other tasks.

For example, step 806 (e.g., determining if a value of the unit of data is fixed for a remainder of the complex computation) may be performed using a means for determining if a value of the unit of data is fixed. The means for determining if a value of the unit of data is fixed can include a compiler and a central processing unit. The means for determining if a value of the unit of data is fixed could include memory to store source code, logs, and analysis databases. For example, memory could be back store 220 or a part of network 330. The means for determining if a value of the unit of data is fixed could include the hardware features mentioned above configured to evaluate a source code of the complex computation. For example, the unit of data may appear in assign statements in the first portion of the source code (referring to the first portion of the complex computation) but not in assign statements in the remainder of the source code. The hardware features mentioned above could also be configured to mark the unit of data as read-only or to mark the unit of data to be stored in cache (e.g., via a header, table, tag, etc.).

Figure 9:
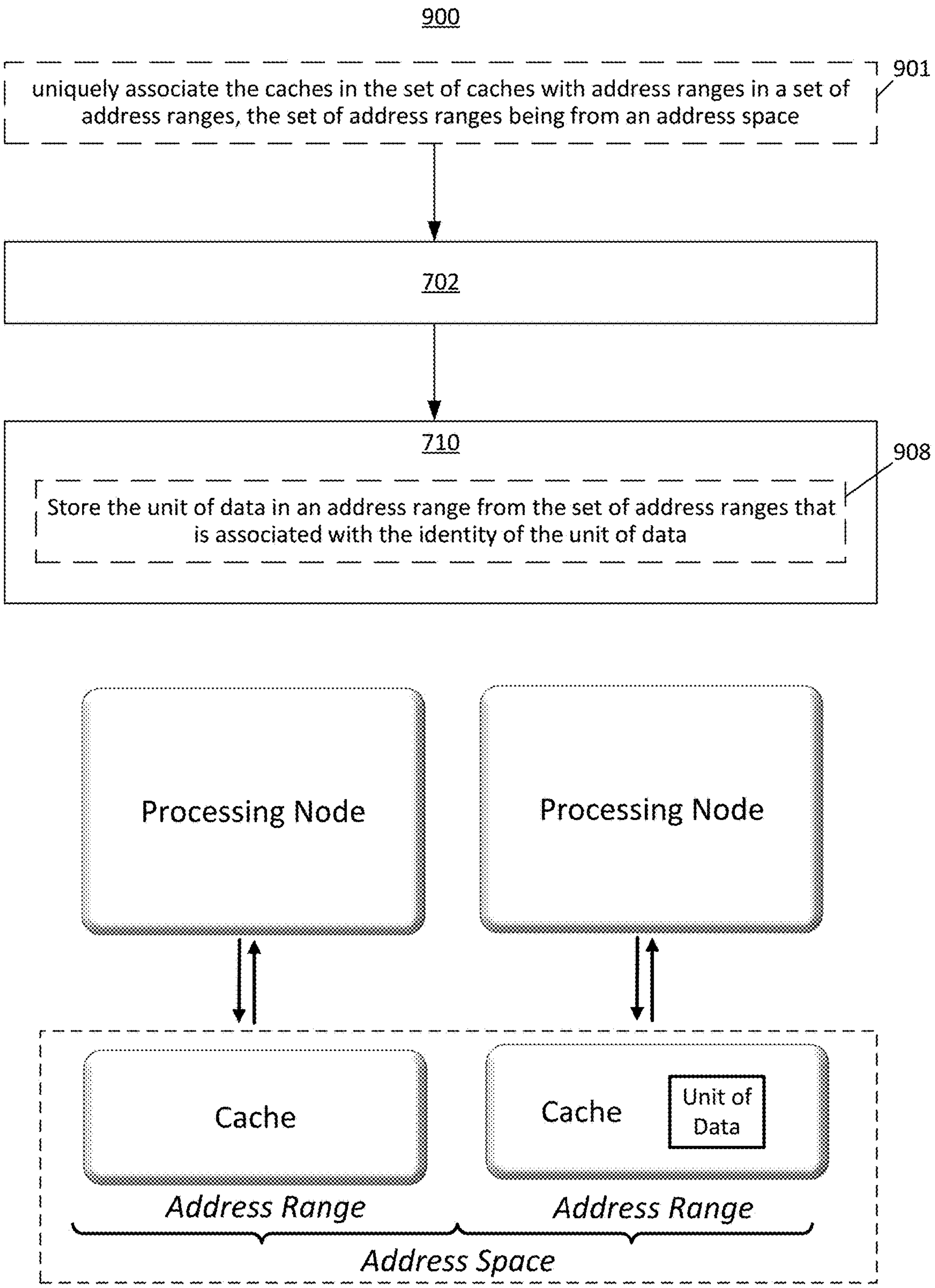
FIG. 9 provides an example of a method of storing a unit of data in a set of caches based on an address identity of the unit of data in accordance with specific embodiments of the inventions disclosed herein.

FIG. 9 illustrates an example of method 900 of storing a unit of data in a set of caches based on an address identity of the unit of data in accordance with specific embodiments of the inventions disclosed herein. Each step of method 900 may be conducted by a set of computational nodes that are networked by an interconnect fabric. Method 900 may be implemented by a system including means for performing the steps of method 900. Method 900 may be implemented by a system including a set of computational nodes, an interconnect fabric, and a set of caches. In specific embodiments, the system may also include compiled instructions, a set of address ranges, a memory controller, and a third level cache. Steps, or portions of steps, of method 900 may be duplicated, omitted, rearranged, or otherwise deviate from the form shown. Additional steps may be added to method 900. The steps of method 900 may be performed in series, in parallel, or may overlap. Aspects and steps of method 700, including steps 702 and 710, may be implemented in method 900. Aspects and steps of method 800 may be implemented in method 900.

In specific embodiments, at step 901, the caches in the set of caches may be uniquely associated with address ranges in a set of address ranges. Each cache may be associated with an address range. The set of address ranges may be from (e.g., part of) an address space. In specific embodiments, the shared address space can be a global address space that is shared by all the computational nodes that are cooperatively executing the composite computation. In specific embodiments, the address space and the location of the data within the address space can be administrated by one or more tables in the computational nodes. The table or tables may only distinguish between local and remote address ranges while a separate table associated with the network administrates the transfer of remote address requests to the appropriate cache in the system.

The system can keep track of which variables are stored in which addresses using a fixed mapping that is set when the computational nodes are first initialized for a composite computation or using a variable mapping that can change through the course of a composite computation. The mapping can be stored in a table that is maintained by all the computational nodes independently. Alternatively, each computational node can maintain a mapping of which variables are stored in which local addresses while all other variables are assumed to be remotely stored and maintain a mapping that is accessible to the network; or a memory controller may maintain the table for the remotely stored variables. The mapping can be maintained in software such that the address ranges associated with different caches can be modified in size depending upon whether the memory that is used to instantiate the caches needs to be used for other purposes such as being assigned to be used as a scratch pad for a processing node. Setting the mapping can also involve allocating specific address ranges for specific processing nodes based on how much data they will need to write to the cache; a processing node that is going to produce more writes may be given a larger address range. In specific embodiments, a compiler operating on a source code description of the composite computation may uniquely associate the caches with address ranges. In specific embodiments, a developer may uniquely associate the caches with address ranges. After step 901, method 900 may proceed to step 702.

At step 702, an identity of a unit of data may be determined. In specific embodiments, the identity of the unit of data may be an address (or address range) of the unit of data. After step 702, method 900 may proceed to step 710.

At step 710, the unit of data may be stored in a set of caches. The caches in the set of caches may be uniquely associated with the computational nodes in the set of computational nodes. The unit of data may be stored in the set of caches based on the identity of the unit of data (e.g., determined at step 702).

In specific embodiments and as part of storing the unit of data, at step 908, the unit of data may be stored in an address range from the set of address ranges that is associated with the identity of the unit of data. In specific embodiments, the cache policy of all the caches in the system can be set such that each individual computational node only has write access to their associated address range within the shared address space. In specific embodiments, the unit of data may be output data of a first computational node in the set of computational nodes and the address range may refer to a cache that is part of a second computational node in the set of computational nodes. The unit of data may be used as an input to the second computational node. For example, the unit of data may be written remotely and read locally. By storing the unit of data based on the associated address (e.g., the identity) of the unit of data, cache coherency is obviated because there is only one unique place that data can be stored across the system.

In specific embodiments, method 900 may be implemented by a system including means for performing each step. The means may include or be implemented on or using one or more processors, microprocessors, embedded processors, digital signal processors, media processors, multiprocessors, controllers, microcontrollers, processing cores, chiplets, integrated circuits, busses, addressable busses, wires, couplings, wireless communications, memory (e.g., DRAM, SRAM, cache, registers, etc.), logic, amplifiers, network interface controllers (NICs), code, etc. More specific means associated with each step of method 900 are provided below.

For example, step 901 (e.g., uniquely associating the caches with address ranges) may be performed using a means for uniquely associating the caches with address ranges. The means for uniquely associating the caches with address ranges can include a central processing unit, a memory management unit, and a cache controller. For example, the cache controller could be memory controller 630. The means for uniquely associating the caches with address ranges could include address decoders, hit/miss logic, multiplexers, data buses, and address buses. The means for uniquely associating the caches with address ranges could include the hardware features mentioned above configured to administrate one or more tables in the computational nodes. The table or tables may only distinguish between local and remote address ranges. The hardware features mentioned above could also be configured to administrate the transfer of remote address requests to the appropriate cache in the system.

For example, step 908 (e.g., storing the unit of data in an address range that is associated with the identity of the unit of data) may be performed using a means for storing the unit of data in an address range. The means for storing the unit of data in an address range can include computational nodes and caches. For example, the computational nodes could be core 200, 210, 300, 310, 600, and 610 and the caches could be caches 201, 211, 302, 312, 601, 602, 611, 612, and 620. The means for storing the unit of data in an address range could include a central processing unit, a memory management unit, a cache controller, address decoders, hit/miss logic, multiplexers, data buses, and address buses. For example, the cache controller could be memory controller 630. The means for storing the unit of data in an address range could include the hardware features mentioned above configured to use a fixed mapping that is set when the computational nodes are first initialized for a composite computation or to use a variable mapping that can change through the course of a composite computation. The hardware features mentioned above could also be configured to maintain the mapping as well as tables for remotely stored variables.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while examples in this disclosure were directed to networks of computational nodes, the approaches disclosed herein are broadly applicable to sets of computational nodes that are commonly executing a composite computation regardless of the degree or manner of communication between the nodes. Additionally, while the specific examples provided herein included only two cores, the approaches disclosed herein are more broadly applicable to sets of computational nodes with much higher cardinality. These and other modifications and variations to the present invention may be practiced by those skilled in the art, without departing from the scope of the present invention, which is more particularly set forth in the appended claims.

What is claimed is:

1. A system comprising:

a set of computational nodes;

an interconnect fabric that networks the set of computational nodes; and a set of caches wherein the caches in the set of caches are uniquely associated with the computational nodes in the set of computational nodes and store data in the caches in the set of caches based on an identity of the data;

wherein the caches in the set of caches store data based on an identity of the data in that:

the set of computational nodes are configured to execute a complex computation; and each computational node is configured to, when storing data in memory, determine an identity of the data, determine if a value of the data is fixed for a remainder of the complex computation, and store the data in the cache memory based on the determination that the value is fixed for the remainder of the complex computation.

2. The system of claim 1, wherein the caches in the set of caches store data based on an identity of the data in that:

each computational node is configured to, when storing data in memory, distinguish read-only data from other data and store the read-only data in the set of caches based on the distinction that the data is read-only data.

3. The system of claim 2, further comprising:

compiled instructions, for a complex computation to be executed by the set of computational nodes, that mark the data as read-only after a portion of the complex computation has been executed.

4. The system of claim 1, wherein the caches in the set of caches store data based on an identity of the data in that:

the system further comprises a set of address ranges from an address space wherein the caches in the set of caches are uniquely associated with address ranges in the set of address ranges; and each computational node is configured to, when storing data in memory, determine an identity of the data and store the data in an address range from the set of address ranges that is associated with the identity.

5. The system of claim 4, wherein:

the data is output data of a first computational node in the set of computational nodes; and the address range refers to a cache that is part of a second computational node in the set of computational nodes, wherein the data is used as an input to the second computational node.

6. The system of claim 1, wherein the data is trained data of an artificial intelligence model.

7. The system of claim 1, further comprising:

a memory controller; and a third level cache that is: (i) shared by the computational nodes in the set of computational nodes; and (ii) directly administrated by the memory controller;

wherein a caching policy of the set of computational nodes routes all cache writes to the third level cache.

8. A method, in which each step is conducted by a set of computational nodes that are networked by an interconnect fabric, comprising:

determining an identity of a unit of data; and storing the unit of data in a set of caches, wherein the caches in the set of caches are uniquely associated with the computational nodes in the set of computational nodes, based on the identity of the unit of data;

wherein determining the identity of the unit of data comprises distinguishing read-only data from other data;

wherein storing the unit of data comprises storing the read-only data in the set of caches based on the distinction that the unit of data is read-only data; and wherein distinguishing read-only data from other data comprises determining that the unit of data is read-only data based on a variable of the unit of data appearing in a single assign statement in a source code.

9. The method of claim 8, further comprising:

uniquely associating the caches in the set of caches with address ranges in a set of address ranges, the set of address ranges being from an address space;

wherein storing the unit of data comprises storing the unit of data in an address range from the set of address ranges that is associated with the identity of the unit of data.

10. The method of claim 9, wherein:

the unit of data is output data of a first computational node in the set of computational nodes; and the address range refers to a cache that is part of a second computational node in the set of computational nodes, wherein the unit of data is used as an input to the second computational node.

11. The method of claim 8, further comprising:

executing, by the set of computational nodes, a first portion of a complex computation; and determining if a value of the unit of data is fixed for a remainder of the complex computation;

wherein storing the unit of data in the set of caches is based on the determination that the value is fixed for the remainder of the complex computation.

12. The method of claim 8, wherein the unit of data is trained data of an artificial intelligence model.

13. The method of claim 8, further comprising:

routing all cache writes to a third level cache, wherein the third level cache is: (i) shared by the computational nodes in the set of computational nodes; and (ii) directly administrated by a memory controller.

14. A system, comprising:

means for determining an identity of a unit of data;

means for storing the unit of data in a set of caches, wherein the caches in the set of caches are uniquely associated with computational nodes in a set of computational nodes, based on the identity of the unit of data;

means for executing a first portion of a complex computation; and means for determining if a value of the unit of data is fixed for a remainder of the complex computation;

wherein storing the unit of data in the set of caches is based on the determination that the value is fixed for the remainder of the complex computation.

15. The system of claim 14, wherein:

the means for determining the identity of the unit of data comprises means for distinguishing read-only data from other data; and the means for storing the unit of data comprises means for storing the read-only data in the set of caches based on the distinction that the unit of data is read-only data.

16. The system of claim 14, further comprising:

means for uniquely associating the caches in the set of caches with address ranges in a set of address ranges, the set of address ranges being from an address space;

wherein the means for storing the unit of data comprises means for storing the unit of data in an address range from the set of address ranges that is associated with the identity of the unit of data.

17. A method, in which each step is conducted by a set of computational nodes that are networked by an interconnect fabric, comprising:

determining an identity of a unit of data;

storing the unit of data in a set of caches, wherein the caches in the set of caches are uniquely associated with the computational nodes in the set of computational nodes, based on the identity of the unit of data;

executing, by the set of computational nodes, a first portion of a complex computation; and determining if a value of the unit of data is fixed for a remainder of the complex computation;

wherein storing the unit of data in the set of caches is based on the determination that the value is fixed for the remainder of the complex computation.

* * * * *